United States Patent
Vinukonda et al.

(10) Patent No.: US 10,931,683 B2
(45) Date of Patent: Feb. 23, 2021

(54) AUTOMATIC TOKEN-BASED SECURE CONTENT STREAMING METHOD AND APPARATUS

(71) Applicant: VERIZON MEDIA INC., New York, NY (US)

(72) Inventors: Sudheer Vinukonda, Santa Clara, CA (US); Omer Luzzatti, Portola Valley, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/448,537

(22) Filed: Jun. 21, 2019

(65) Prior Publication Data

US 2019/0312884 A1 Oct. 10, 2019

Related U.S. Application Data

(63) Continuation of application No. 15/408,713, filed on Jan. 18, 2017, now Pat. No. 10,333,945.

(51) Int. Cl.
| | | |
|---|---|---|
| *H04L 29/06* | (2006.01) | |
| *H04L 29/08* | (2006.01) | |
| *H04W 12/06* | (2021.01) | |
| *H04W 12/08* | (2021.01) | |
| *H04W 12/00* | (2021.01) | |

(52) U.S. Cl.
CPC ........ *H04L 63/108* (2013.01); *H04L 63/0807* (2013.01); *H04L 63/107* (2013.01); *H04L 65/4084* (2013.01); *H04L 67/02* (2013.01); *H04W 12/06* (2013.01); *H04W 12/08* (2013.01); *H04L 67/06* (2013.01); *H04L 67/327* (2013.01); *H04W 12/00503* (2019.01)

(58) Field of Classification Search
CPC ... H04L 63/08; H04L 63/0807; H04L 63/102; H04L 63/0853; H04L 29/06823; H04L 9/3234; G06F 21/6218; G06F 21/34; G06F 21/33
See application file for complete search history.

(56) References Cited

U.S. PATENT DOCUMENTS

| | | | | |
|---|---|---|---|---|
| 8,650,283 | B1 * | 2/2014 | Chang | H04N 21/632 |
| | | | | 709/224 |
| 8,844,001 | B2 * | 9/2014 | Hao | H04L 63/08 |
| | | | | 726/4 |
| 9,860,324 | B1 * | 1/2018 | Roskind | H04L 67/141 |
| 2013/0283033 | A1 * | 10/2013 | Ahuja | H04L 63/0807 |
| | | | | 713/150 |

FOREIGN PATENT DOCUMENTS

CA 2723607 A1 5/2012

* cited by examiner

*Primary Examiner* — Ali S Abyaneh
(74) *Attorney, Agent, or Firm* — James J. DeCarlo; Greenberg Traurig, LLP

(57) ABSTRACT

Disclosed are systems and methods for improving interactions with and between computers in secure content access, distribution and download and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatic token-based secure content streaming.

20 Claims, 8 Drawing Sheets

Below is an example of a Tokenized URL:

http://ci-2f2ddf1014-42e4a220.http.atlas.cdn.vimg.com/live/dax-global/external/mlbgotd/mlbgotd_vtt_m3u8?a=mlbcom&ib=sapi&ih=42e4a220&ns=c+i+cii+ps+flags+ru&s=a7094d203361e47eb844bb6c6934800a&vid=a9e3eb77-9f64-3f2a-92c1-63fc274fc2fb&x=1469600681&ps=66xdrh32

In the above URL, the parameter ih=42e4a220 is a hash of the client IP address, the parameter x=1469600681 is a URL expiration and the parameter s=a7094d203361e47eb844bb6c6934800a is a URL signature (MD5 hash using a shared secret key between the CMS server and the CDN Server).

In the above example, the signature parameter s=a7094d203361e47eb844bb6c6934800a is an MD5 hash of the entire URL including all of the embedded URL parameters.

Below is an example of a HTTP Session Cookie (sent as a HTTP header by a media player of a user device).

Cookie: ih=42e4a220&x=1469600681&s=a7094d203361e47eb844bb6c6934800a

Figure 7

AUTOMATIC TOKEN-BASED SECURE CONTENT STREAMING METHOD AND APPARATUS

CROSS REFERENCE TO RELATED APPLICATIONS

This application is a continuation of and claims priority from co-pending U.S. patent application Ser. No. 15/408,713, filed Jan. 18, 2017, entitled AUTOMATIC TOKEN-BASED SECURE CONTENT STREAMING METHOD AND APPARATUS, the contents of which are hereby incorporated by reference.

FIELD OF THE DISCLOSURE

The present disclosure relates to secure content accessing, and more particularly to providing token-based secure content access.

BACKGROUND

The world wide web has become a popular mechanism for receiving content for playback at a user device. The content can comprise audio and/or video content, and the user device can be any of a number of user devices, including a personal computer, tablet, mobile telephone, etc., connected to the web. In some cases, a user may use multiple devices to play the same content. For example, the user may use a television connected to the web (e.g., a smart television) as well as a handheld device connected to the web to receive the content at both devices. In some cases, a user may be using a mobile device to play content while physically moving from one geographic location to another. As the user changes geographic locations, the network address (e.g., the Internet Protocol or IP address) can change. In addition, some user devices may have more than one network interface card, each of which has its own network address.

SUMMARY

The present disclosure provides novel systems and methods for automatic token-based secure content access, such as and without limitation access to streaming content. In some embodiments, a media player, or other application executing on a user's device, transmits a request including an identifier of the content in response to a user's selection of the content's link at the user's device; the request also includes a network address, e.g., an IP address, of the user's device. The request is received by a web server, e.g., a content management system (CMS) server, which provides a content master playlist comprising information (e.g., universal resource locators (URLs)) corresponding to the content item. A URL can identify a web server, e.g., a content delivery network (CDN) server, or CDN URL, to which the media player can make a content download request. By way of some non-limiting examples, a CDN URL might be used to request a media playlist, a media segment, or the like.

In one scenario, content can be encoded to create a number of variants of the content at different bit rates, resolutions, and qualities. In addition, an encoder can segment content into a number of sections, or media segments, and each media segment encoded at a certain bit rate, resolution and quality level is stored in a media file. A content master playlist file can be created to contain a list of the URLs to variant media playlists (each of which contains a list of URLs pointing to the variant's media segments (or media segment files)). In this scenario, the response provided by the CMS server to the media player's content access request can comprise a content master playlist.

A content master playlist comprising an identifier (e.g., a URL or other information) for each of a number of variant media playlists can be used to request a variant media playlist (e.g., request a file corresponding to a variant and containing the media segment URLs for the variant and a specified playback order). A media player retrieves a media playlist URL for a desired variant from the content master playlist and requests the variant media playlist (e.g., from a CDN server) using the URL (corresponding to the variant) from the content master playlist. The media player uses the media segment URLs in a received variant media playlist to request a number of media segments (e.g., from a CDN server identified by each media segment URL). By way of a non-limiting example, a variant can be determined by the media player, or by another device such as the CMS server, CDN server, etc., based on resource capabilities, such as and without limitation network bandwidth (or capacity), user device resource limitations (e.g., memory, processor speed, graphic processing capabilities, etc.).

Streaming content over an electronic communications network that includes the Internet provides considerable flexibility for users to playback content; however, there are a number of issues that arise with the use of the Internet to stream content. One such issue involves the potential for multiple different IP addresses being used by the media player (or other client application or component) to communicate with the server(s) to retrieve content. For example, using a mobile user device with a media player and connected to the network, a user can playback content as the user is on the move. As the user is moving, the IP address of the user device can change as the user device moves from one cellular tower to another, shifts between a wireless network and a cellular network, etc. As yet another non-limiting example, a user device, such as a multi-home device, may have more than one network interface card (NIC), each of which has its own IP address that can be used by the user device. As yet a further non-limiting example, IP addresses can differ by destination as a result of proxies, network address translations (NATs) and enterprises, or the like.

Another issue that may arise with content access over the Internet involves geographic restrictions, or geo-restrictions, that may be placed on access to the content; and, attempts by users to circumvent the geo-restrictions using an unauthorized publication of the URL(s) corresponding to a content master playlist, a variant media playlist, and/or a media segment. By way of one example, a content provider, content owner, etc. may wish to restrict access to streaming content, such as and without limitation content of a live sporting (or other) event, so that viewership of the live event is restricted to viewers that are outside a geographic area in which the live event is taking place, and viewers that are local to (e.g., within) the geographic area are denied access to the live sporting event's streaming content.

A user's geographic location can be determined using the IP address sent by the user device in the request for content and a mapping of the IP address to a geographic location. By way of a non-limiting example, a content provider might use the network address of the user's user device to determine the geographic location of the user, and then use the determined geographic location to determine whether or not to restrict, or block, access to certain content, such as a live broadcast of a sporting event, based on the user's geographic location. A common internet standard implementation is for a content provider to use a mapping (which can be provided by an Internet Service Provider (ISP) or third-party service) of IP addresses and zip codes to identify the user's zip code, and to block the user's access to the content if that IP address maps to a restricted ZIP code.

As discussed herein, a way to circumvent a geo-restriction is to obtain (e.g., via an unauthorized publication) the URL(s) corresponding to a content master playlist, a variant media playlist, and/or a media segment. Each user device that uses an unauthorized publication of a URL does so using a different IP address. Such unauthorized attempts to access content should be identified and blocked. Normal changes in IP address (for reasons such as discussed above) should be identified and authorized so that an authorized user can continue to experience content despite a change in IP address. However, since it is difficult, if not impossible, to determine whether a IP address change is associated with an unauthorized access request or is associated with an authorized access request, a typical approach is to deny access in response to any IP address change even in a case that it is associated with an authorized access request.

Restricting access (or validation of access) to content based on a single IP address is too rigid and can cause frustrating interruptions in content streaming for a legitimate user while experiencing content as the user device undergoes changes in its IP address (such as an IP address change caused by movement of a mobile user device, e.g., movement across cellular towers and/or movement between cellular, wired and wireless networks, or an IP address change caused by a user device that supports multi-homing (with multiple IP addresses), etc.). Such an IP-address validation demands that a user experience content using a single IP address during a session, which may not be feasible. By way of one non-limiting example, a CMS may host a website using a domain, e.g., sports.yahoo.com, and a CDN may be hosted on a separate domain, e.g., atlas.cdn.yimg.com, e.g., to isolate CMS and CDN resources for performance reasons. In other words, use of a single IP address during a session might be infeasible; however, allowing multiple IP addresses can result in unauthorized distribution of URLs such that multiple user devices (with different IP addresses) are able to experience content without authorization.

Access restriction based on dynamic short-lived Hypertext Transport Protocol (HTTP) session cookies alone is problematic given that many client applications (e.g., browser, media player, etc. applications) block cookies (or might allow cookies from the same domain) by default, and many user devices do not even support cookies. Furthermore, HTTP session cookies cannot prevent a user with an HTTP session cookie from sharing or publishing master/media playlist URL(s) with other users that do not have an HTTP session cookie, so that the other users (e.g., viewers in blackout areas) can use the URL(s) to gain unauthorized access to the content. Moreover, cookies are expensive to generate and a large scale use would typically require a separate domain for CDNs for latency and/or security reasons.

The automatic token-based secure content streaming described herein addresses these and other problems and enables authorized access to content (e.g., streaming content) using a number of different IP addresses per secure token (e.g., a secure token corresponding to a viewing request), while minimizing unauthorized attempts to access content. This presents improvements to the secure distribution of content, and enables access to content by an authorized user via the secure token and over an electronic communications network, such as the Internet, despite changes in the IP address of the user device being used by the authorized user.

According to some embodiments, the disclosed systems and methods first receive a request to access content, e.g., streaming content, from a user device. In some embodiments, the content access request can be validated to determine whether or not to authorize the request to access the content. As one example, validation might be performed to determine whether any geographic restrictions exist (a geo-restriction validation) to block access to the content. Embodiments of the present disclosure can use a secure token for token-based validation for secure content access, distribution and download to users, such as and without limitation anonymous users. In some embodiments of the present disclosure, token-based validation can be used in combination with other types of validation, such as and without limitation geo-based validation (such as the geo-restrictions discussed herein), user-based validation (e.g., validation based on user identification information, such as and without limitation a username and password), or the like.

After a determination is made to authorize access to the content (via geographic, user, etc. validation(s)), a secure token is generated and associated with the IP address used by the user device in making the content access request. The IP address associated with the content access request can be the IP address received with the content access request. The secure token can comprise an encrypted value generated from information, such as and without limitation the IP address received with the content access request alone or in combination with a short-lived expiration time. The secure token can be generated by encrypting the information using an encryption algorithm such as MD5. The secure token is provided to the user device (having the IP address) from which the content access request is received, in response to the received content access request. In one example, the secure token is transmitted with a content master playlist comprising information for retrieving any of a number of variant media playlist. In some embodiments, the response can include a URL comprising one or more secure token parameters. As another alternative, the secure token can be transmitted via a cookie (e.g., an HTTP session cookie) to the user device from which the content access request is received (e.g., in a case that cookies are supported by the user device and are not blocked).

The disclosed systems and methods then receive a subsequent request, e.g., a content download request) including the secure token transmitted to the user device in response to the content access request. The content download request is a request to transmit content (e.g., a variant media playlist, a number of media segments, etc.) to the user device. The request can be received by a CDN server corresponding to a URL contained in a content master playlist transmitted to the user device in response to the content access request. The IP address of the user device from which the content download request is received is transmitted with the content download request. Before transmitting the requested content to the user device, the secure token received with the content download request is validated. Token-based validation (which includes secure token validation) can comprise a check to ensure that the secure token is not expired (is still live). By way of a non-limiting example and as discussed herein, the received secure token can have an associated short-lived expiration time which can be retrieved from the received secure token, and the expiration time can be checked against a time associated with the content download request to ensure that the secure token is not expired (is still live).

The disclosed systems and methods, if a determination is made that the secure token is still live, then validate the IP address received in the secure token with the content download request to make a determination whether it matches the IP address received with the content access request (e.g., the IP address used to generate the secure token). By way of a non-limiting example, the secure token received with the content download request can be decrypted by the CDN server to retrieve the IP address associated with the content access request from the secure token. As yet another non-limiting example, the received secure token can be used to retrieve the IP address in a stored mapping, e.g., a mapping associating the secure token with the IP address received with the content access request. As yet another example, the secure token can be retrieved from an HTTP session cookie.

The disclosed systems and methods, if the IP address received with the content access request does not match the IP address received with the content download request, initialize a count (e.g., a mismatch counter) to an initial value (e.g., set to 1 to memorialize the first mismatch), if there is no previous mismatch; or, if there is a previous mismatch, increment an existing mismatch counter (e.g., by 1 to memorialize the current mismatch). A determination is made whether or not the number of mismatches (using the mismatch counter) exceeds a threshold number of mismatches. If the mismatch counter does not exceed the threshold number, the requested content (e.g., a variant media playlist, a section of content, etc.) is transmitted to the user device in response to the received content download request. If the number of mismatches exceeds the threshold number, the content download request is denied. In such a case, the user of the user device can make another content access request. The determination whether or not the mismatch counter exceeds the threshold number of mismatches is selectively performed based on the outcome of the IP-address matching determination.

If the IP address from the secure token (e.g., the IP address associated with the content access request) matches the IP address received with the content download request, the secure token is successfully validated. In accordance with at least one embodiment, the IP address comparison operation is conditionally performed based on the outcome of a determination that the secure token is not expired (e.g., still live). Thus, in accordance with at least one embodiment, the secure token validation can include both a IP address validation and a temporal validation.

It will be recognized from the disclosure herein that embodiments of the instant disclosure provide improvements to a number of technology areas, for example those related to systems and processes that handle or process content distribution and delivery to users over the internet, such as but not limited to, local and/or web-based applications, TV widgets, set-top boxes, or other types of media rendering or platforms. The disclosed systems and methods can effectuate increased flexibility in the ways that users can access and download content while still enforcing restrictions on access to content and minimizing attempts at unauthorized access, thereby maximizing user and content owner and content provider satisfaction, as the disclosed systems and methods, inter alia, validate content access requests received from a user device and accommodate IP address changes that can occur with the user device. Users are provided with a fully automated content streaming experience through the disclosed systems' and methods' token-based secure content streaming. For example, the disclosed token-based content access validation avoids a denial of access due to changes in IP addressing that can occur for a number legitimates reasons, as the disclosed systems and methods can automatically validate a content access request using one or more tokens and a counter identifying a number of IP addressing changes to ensure that the number of IP addressing changes does not exceed a threshold number, thereby limiting unauthorized access to content.

In accordance with one or more embodiments, a method is disclosed which includes receiving, at a computing device and over an electronic communications network, a content download request from a user device, the content download request being a request for a download in connection a content item and having an associated secure token and an associated first network address of the user device, the associated secure token being generated in connection with a previous request made in connection with the content item and having an associated second network address; making and determination, via the computing device and using the secure token received from the user device with the content download request, whether or not to permit the requested download, the determination comprising a first determination whether the first and second network addresses are a match and a second determination that is selectively performed based on an outcome of the first determination, the second determination determining whether a number of network address mismatches associated with the secure token exceeds a mismatch threshold; and transmitting, via the computing device and over the electronic communications network to the user device, a response to the content download request, the response comprising content requested by the content download request in a case that the first and second network addresses match and in a case that the first and second network addresses mismatch but the number of mismatches does not exceed the mismatch threshold.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic token-based secure content streaming.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIG. 7 is an exemplary example of a non-limiting embodiment in accordance with some embodiments of the present disclosure.

DETAILED DESCRIPTION

Figure 1:
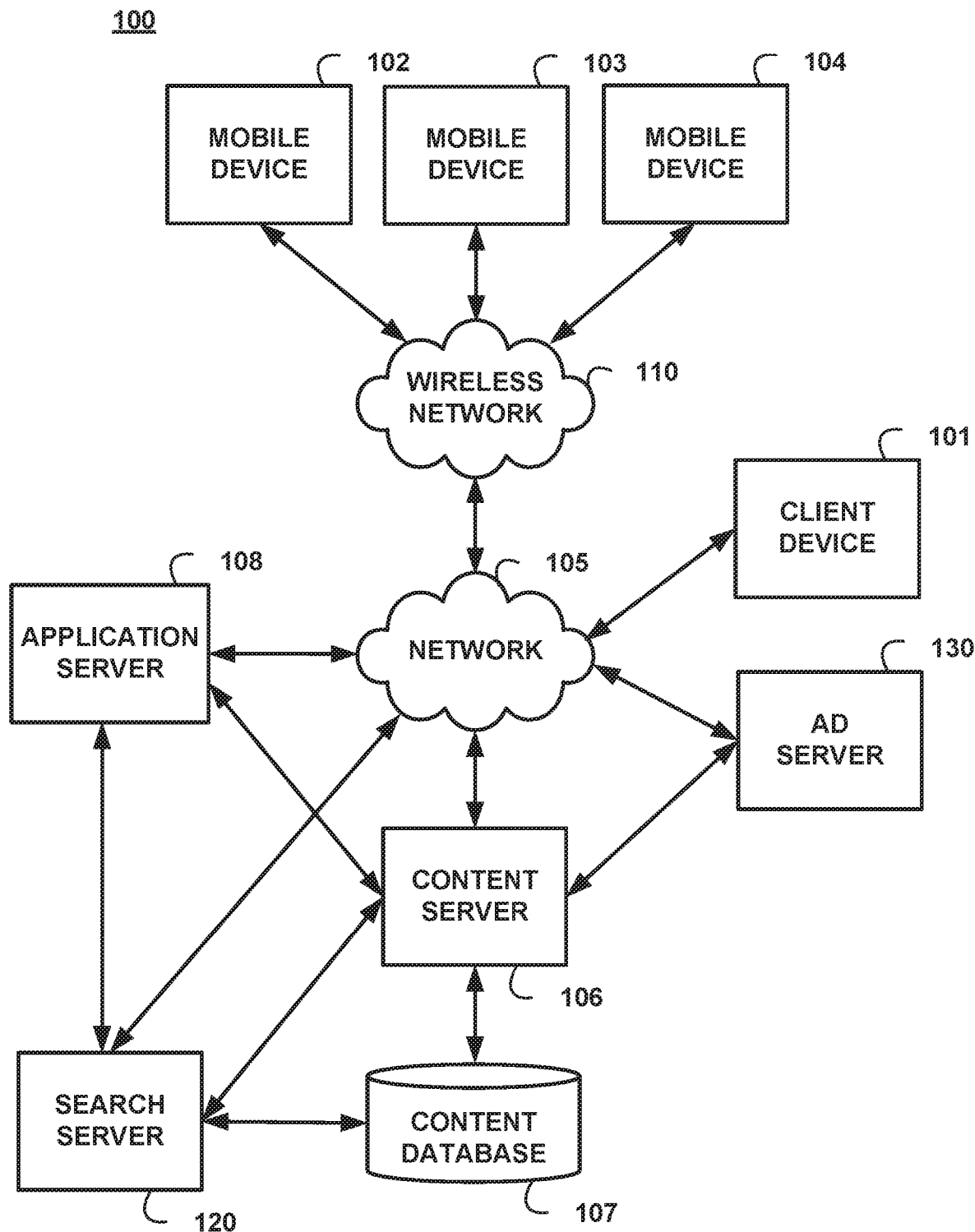
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, the Internet, and/or other electronic communications networks, have been used to transmit content, such as and without limitation streaming audio, video, multimedia, etc. content, to devices, such as and without limitation end user devices including but not limited to smartphones, tablets, notebook computing devices, desktop computing devices or the like. Recently, streaming live events, such as and without limitation sporting events, concerts or the like has become more prevalent.

With the widespread popularity of the Internet and end user devices for streaming content such as live event content, there is currently a huge need for a content digital rights management approach to accommodate unique issues associated with their use. The use of the Internet for streaming content typically involves the use, by end user devices, of IP addresses, and changes in IP addresses as content is being streamed to an end user device poses issues related to secure content access to content and enforcement of restrictions placed on access to content.

Existing systems are incapable of identifying when to allow (or conversely when to deny) content requests when multiple different IP addresses are being used in making the content requests by a user device. One option is to deny access whenever multiple different IP addresses are used by a user device; however, such an approach results in an authorized user being denied access to the content which leads to frustrations and dissatisfaction with the system by the user. Another option is to grant access regardless of the IP address being used, however, such an approach would allow unauthorized access to the content.

As such, the instant disclosure provides a novel solution addressing the immediate demand for an automated system, application and/or platform that uses a number of tokens for secure content streaming. The present disclosure provides novel systems and methods for automatically generating a secure token upon validation of an initial request to access content, which secure token is used to validate subsequent requests to access content that include the secure token. According to some embodiments, the disclosed systems and methods generate the secure token which is associated with the IP address of the user device from which the initial content access request is received, and transmits the secure token to the user device. Thereafter, the user device transmits the secure token (along with a current IP address of the user device) with any subsequent request for the content made to the content management system, e.g., a subsequent request made to a CDN server to download a playlist, media segment, etc. The secure token is used to match the initial IP address (i.e., the IP address used with the initial content access request) with the IP address being used with the current request. If the initial and current IP address match, then the request is granted. If the initial and current IP addresses do not match, then disclosed systems and methods use a mismatch counter to determine whether the number of different IP addresses being used with the secure token to access the content exceeds a threshold number of mismatches. If the count of the number of different IP address exceeds the threshold number, access is denied; otherwise, access is granted. In so doing, present systems and methods provide flexibility to accommodate IP address changes while minimizing unauthorized (or abusive) attempts to access the content.

Examples of benefits derived from the disclosed systems and methods are: 1) the disclosed systems and methods provide a technologically based mechanism for automatically determining the validity of a content access request even in a case that multiple different IP addresses are being used; and (2) the proposed systems and methods provide a technologically based mechanism for automatically identifying unauthorized (or abusive) attempts to access content when multiple different IP addresses are being used. Thus, the disclosed systems and methods, for example, are flexible enough to permit authorized use of multiple different IP addresses in accessing content and to prohibit unauthorized use of multiple different IP addresses to access content.

The disclosed systems and methods can be implemented for any type of content item, including, but not limited to, video, audio, images, text, and/or any other type of multimedia content. While the discussion herein will focus on video content items, it should not be construed as limiting, as any type of content or multimedia content, whether known or to be known, can be utilized without departing from the scope of the instant disclosure.

In accordance with at least one embodiment, streaming protocols such as and without limitation HTTP Live Streaming (HLS) and Dynamic Adaptive Streaming over HTTP (DASH), can be used for transmitting streaming content. Embodiments of the present disclosure allow multiple different IP addresses per viewing session (e.g., per secure token). Embodiments of the present disclosure can be used for content, including streaming content such as and without limitation streaming of content of a live event. In accordance with one or more embodiments, a threshold number (e.g., 3) IP addresses are permitted per a given time interval (e.g., 30 seconds), where the time interval can be identified by the expiration information associated with the secure token. It should be apparent that any threshold number and time interval can be used with embodiments of the present disclosure. In accordance with at least one embodiment, the number of distinct user IP addresses that are allowed to simultaneously (within the time interval) access a content item per secure token is tracked and used to determine whether or not to permit access to the content.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable.

Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
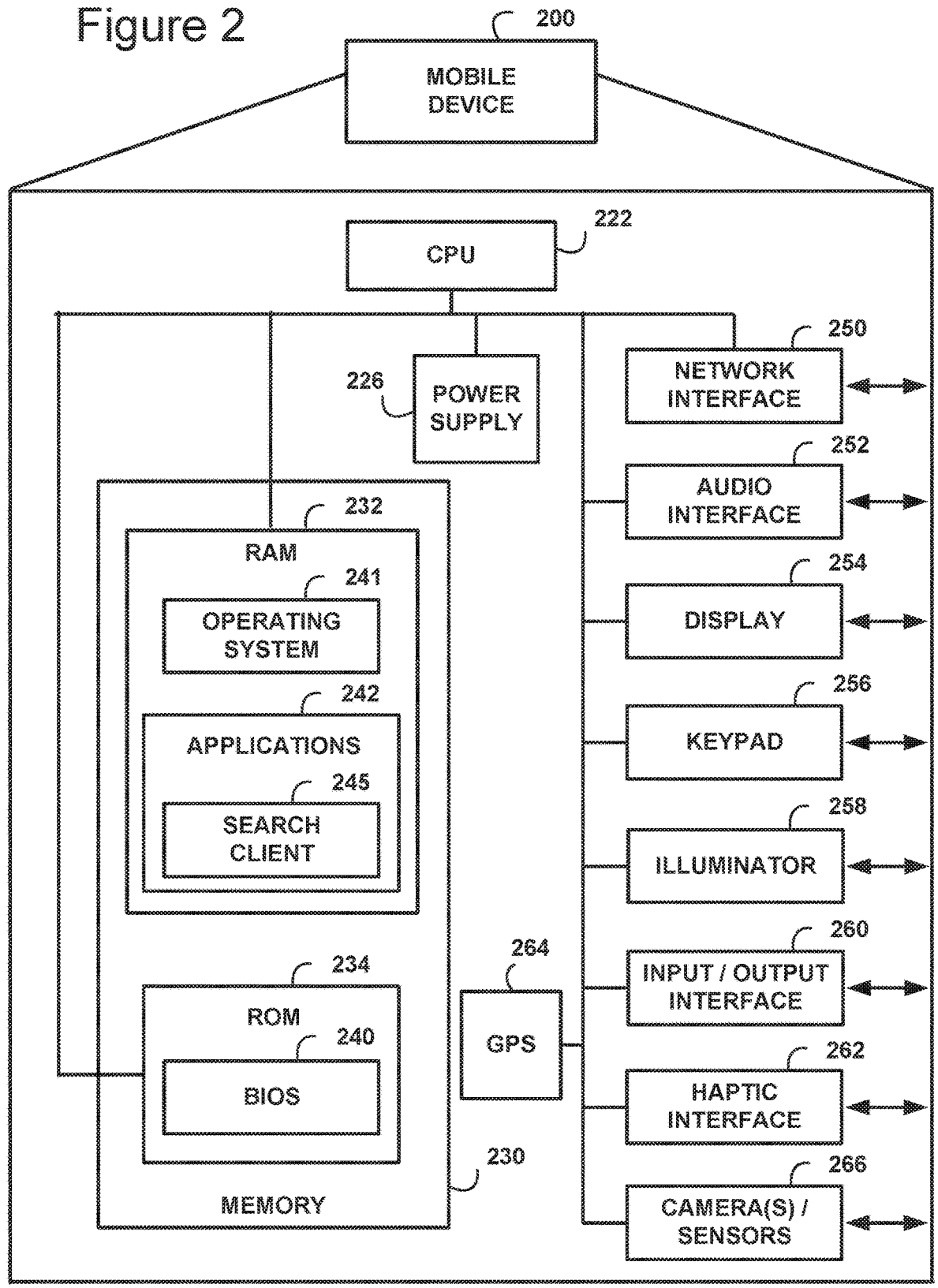
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
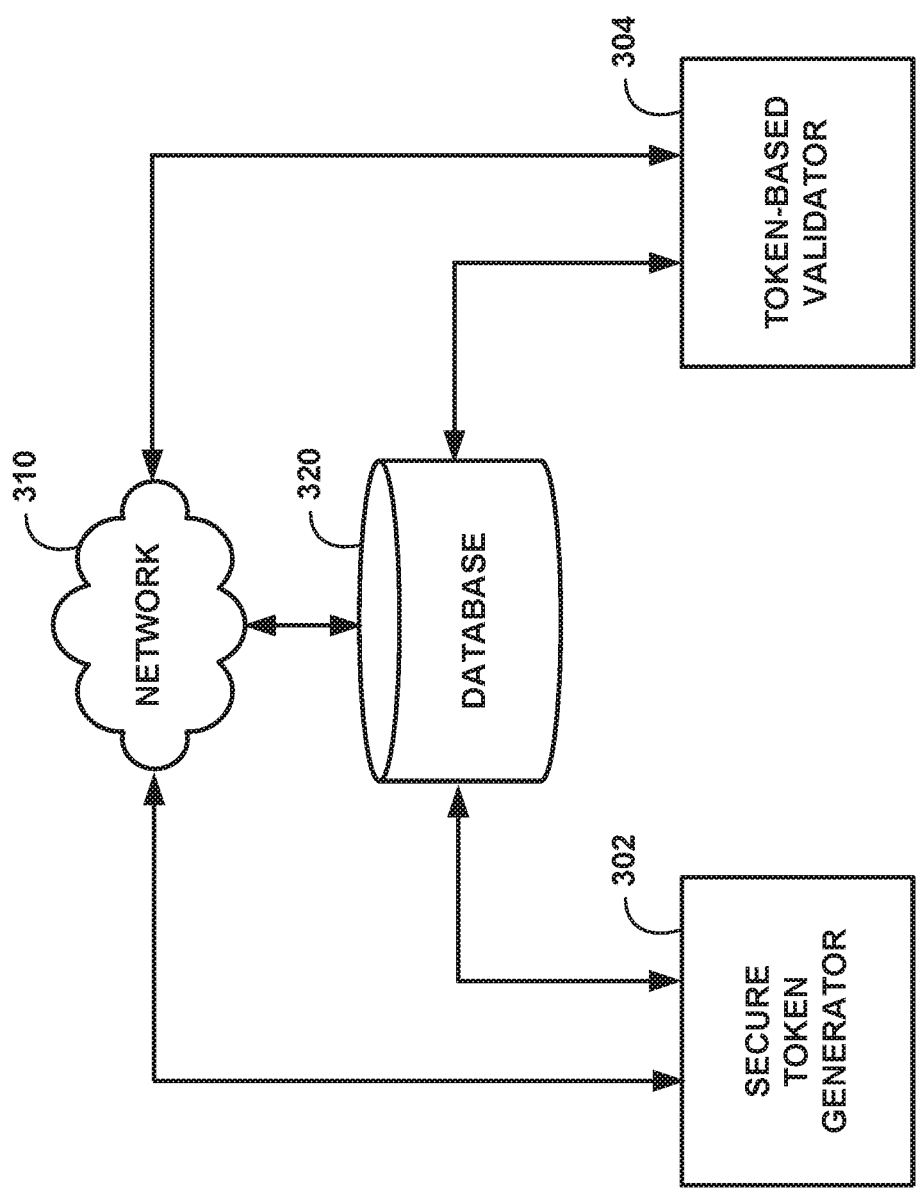
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a secure token generator 302, token-based validator 304, network 310 and database 320. The secure token generator 302 and token-based validator 304 can each be a special purpose machine or processor and can be hosted by an application server, content server, social networking server, web server, search server, content provider, email service provider, ad server, and the like, or any combination thereof. According to some embodiments, secure token generator 302 is hosted by a content management system server (e.g., a backend server of a CMS) and token-based validator 304 is hosted by a CDN server.

According to some embodiments, secure token generator 302 and token-based validator 304 can each be embodied as a stand-alone application. In some embodiments, such application can be a web-based application accessed by the user device, such as and without limitation client device 101, mobile devices 102-104, mobile device 200, or the like, over a network, such as network 310, which can be (or can comprise) network 105 and/or wireless network 110.

The database 320 can be any type of database or memory, and can be associated with a content management system server, content delivery network server, or the like on a network. Database 320 can comprise a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can comprise a number of instances. For example, each server can have a local instance of database 320 storing variant media playlist files, media segment files, tokens, mismatch counts (each of which is associated with a secure token), or the like. As yet another example, a database 320 can store data including without limitation generated secure tokens, content restrictions, etc. As yet a further non-limiting example, database 320 can store data such as and without limitation secure tokens, mappings between secure tokens and IP addresses, etc.

According to some embodiments, user data stored in database 320 can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of creating, recommending, rendering and/or delivering content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

While the discussion below will involve content encoded using video streaming protocols such as Hypertext Transport Protocol Live Streaming (HLS) or Dynamic Adaptive Streaming over Hypertext Transport Protocol (DASH), any content and any content encoding technique can be used. In addition and while the discussion below will involve content streaming, it should be apparent that any type of streaming or downloadable content, including for example text, audio, multimedia, RSS feed information can be used without departing from the scope of the instant application.

The network 310 can be any type of network such as, but not limited to, a wireless network, a local area network (LAN), wide area network (WAN), the Internet, or a combination thereof. The network 310 facilitates connectivity of user devices, secure token generator 302 token-based validator 304, and the database of stored resources 320. Indeed, as illustrated in FIG. 3, the secure token generator 302 and the token-based validator 304 can each be directly connected with the database 320 by any known or to be known method of connecting and/or enabling communication between such devices and resources.

In some embodiments, the principal processor(s), server (s), or combination of devices that comprises hardware programmed in accordance with the special purpose functions herein is referred to for convenience as the secure token generator 302 and the token-based validator 304. It should be understood that the engine(s) and module(s) discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

The information processed by the secure token generator 302 and the token-based validator 304 can be supplied to the database 320 in order to ensure that the information housed in the database 320 is up-to-date as the disclosed systems and methods leverage real-time information associated with items of content, users and/or user devices during or responsive to content streaming (or content retrieval and/or other content download), as discussed in more detail below.

Figure 4:
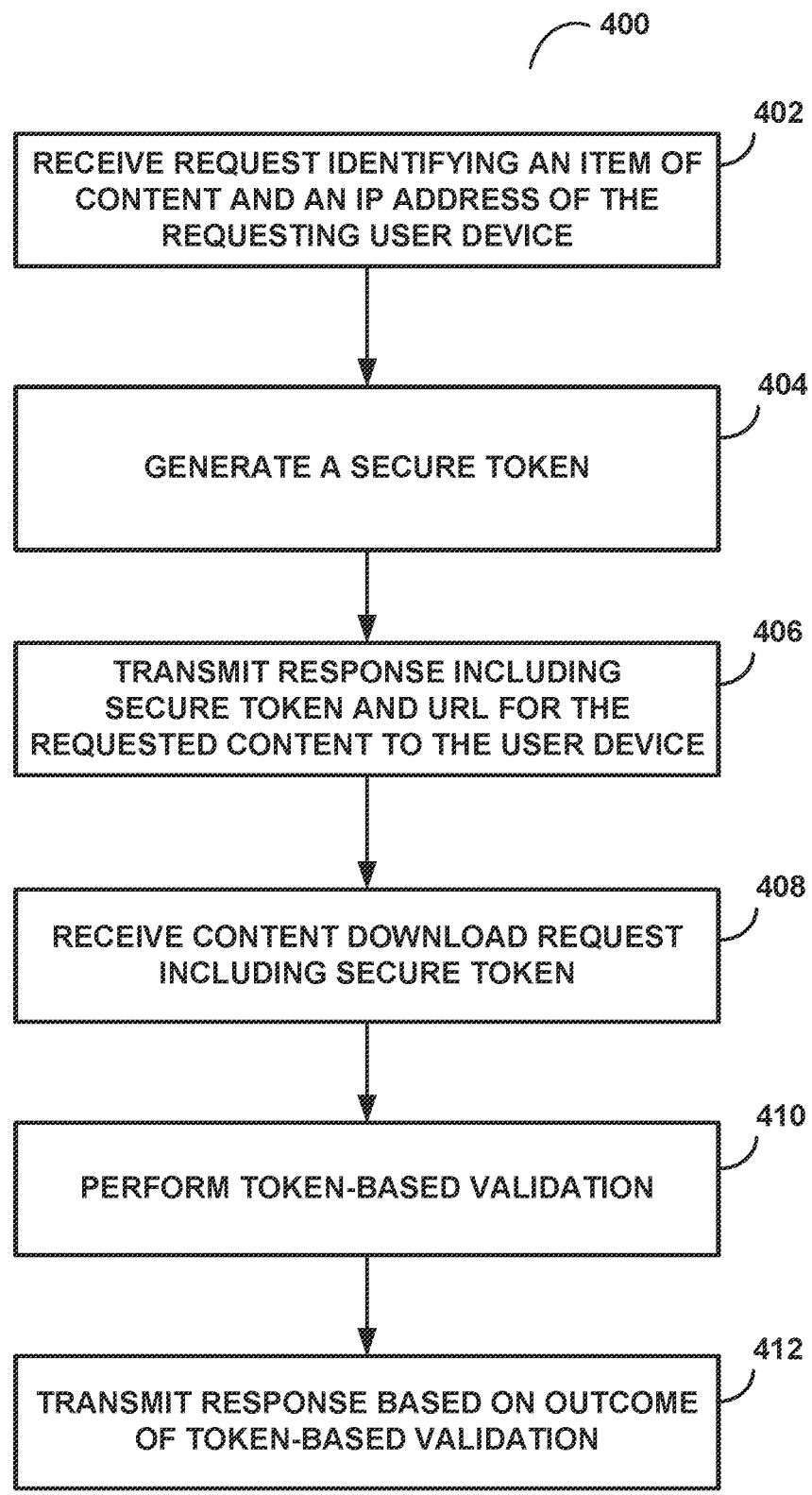
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatic token-based secure content streaming. According to some embodiments, as discussed herein with relation to FIG. 4, the process involves automatically generating a secure token which is used to validate content requests. An IP address associated with the secure token (e.g., the IP address used in generating the secure token) is matched with the IP address associated with a current request. If a mismatch exists, a mismatch counter is incremented to reflect the mismatch, and the mismatch counter is checked against a threshold number of mismatches allowed in a given time period. If the mismatch counter exceeds the threshold, the request is denied. If the IP addresses match or if the mismatch counter does not exceed the threshold, the request is granted. In so doing, IP address changes associated with a user device are accommodated while preventing abuses such as unauthorized content access associated with unauthorized publication of URLs.

At step 402, a request is received by secure token generator 302 from a media playback component (e.g., a media player) of a user device (e.g., client device 101, mobile devices 102-104, mobile device 200 or the like). The request identifies the IP address of the user device. The request may be a user's request to experience (e.g., view and/or listen to) an item of content identified in the request. The request might be initiated in response to the user's content selection (e.g., a hyperlink selection) in a web page displayed in a graphical user interface (GUI) of a browser application executing on the user device, a GUI of the media player, etc.

Figure 5:
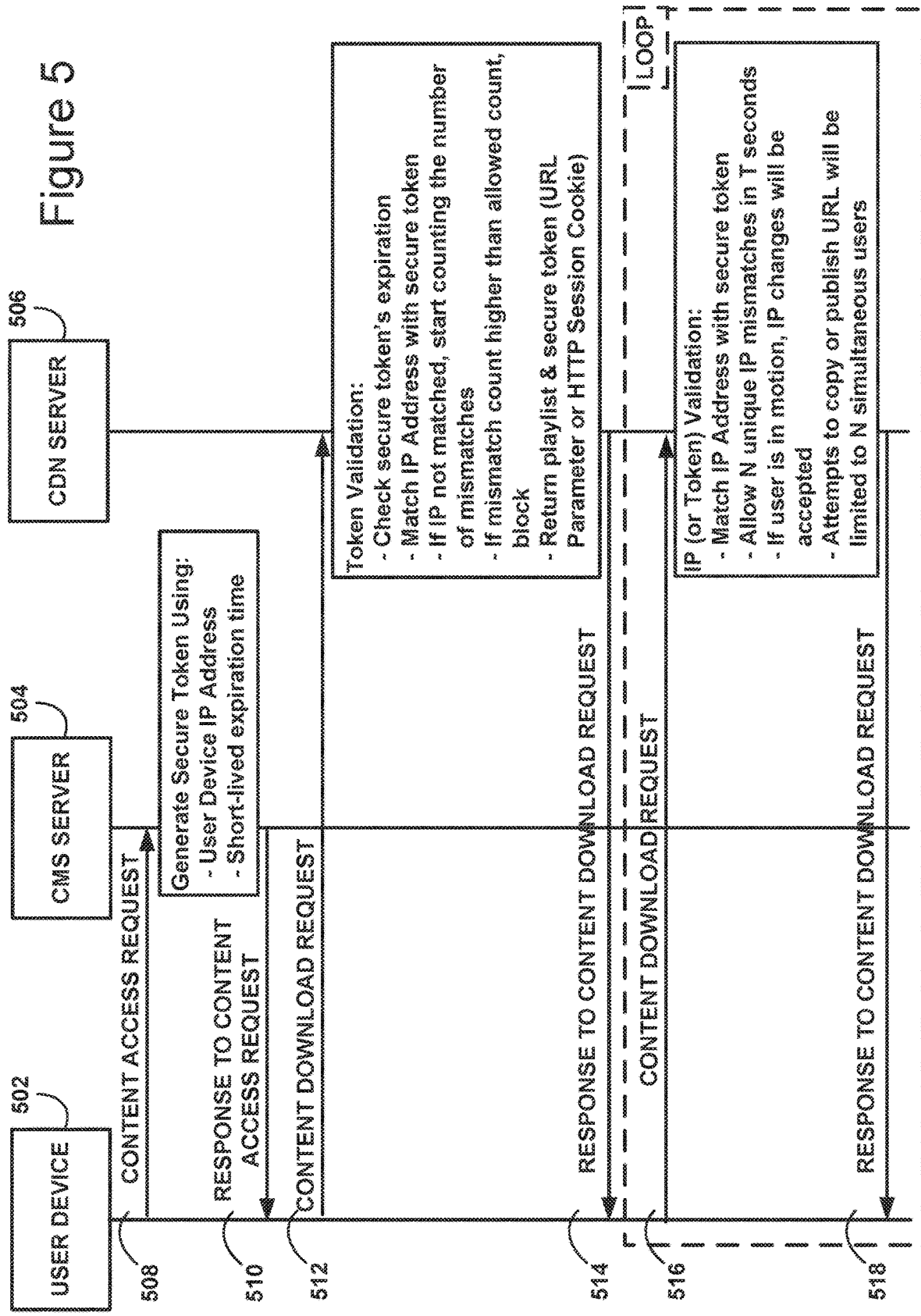
FIG. 5 is a diagram of an exemplary example of a non-limiting embodiment in accordance with some embodiments of the present disclosure.

By way of a non-limiting example, FIG. 5 illustrates the discussion respective to the steps of FIG. 4. FIG. 5 provides non-limiting examples of requests made by a user device 502, e.g., a media player application executing on the user device 502 (e.g., client device 101, mobile devices 102-104, mobile device 200, or the like) to a CMS server 504 implementing the secure token generator 302 and a CDN server implementing the token-based validator 304, and responses thereto.

In the example shown in FIG. 5, request 508 corresponds to the request received at step 402 of FIG. 4. The request 508 is a request for a content master playlist and includes a unique identifier of the item of content for which the content master playlist is being requested. The request further includes the IP address of the user device 502.

In some embodiments, CMS server 504 can validate the content access request to determine whether or not to authorize the content access request. As one example, validation might be performed to ensure that any geographic restrictions exist (a geo-restriction validation). Embodiments of the present disclosure can be used for validation of anonymous users. In some embodiments, token-based validation can be used in combination with other types of validation, such as and without limitation geo-based validation (such as the geo-restrictions discussed herein), user-based validation (e.g., validation to ensure that the user based on identification information, such as and without limitation a username and password), or the like.

Referring again to FIG. 4, a secure token is generated, by the secure token generator 302 implemented by the CMS server 504, and is associated with the IP address associated with the content access request, e.g., request 508 of FIG. 5, at step 404. The IP address associated with the content access request can be the IP address received with the content access request 508, in the example of FIG. 5. This IP address can be used alone or in combination with other information (e.g., an expiration time) in generating the secure token. The secure token can be generated after a determination is made that there are no access restrictions and/or the user is determined to be a user authorized to access the requested content.

In some embodiments, the secure token comprises an encrypted value generated from information, such as and without limitation the IP address received with the content access request (e.g., request 508) and a short-lived expiration time. The secure token can be generated by encrypting the information using an encryption algorithm such as MD5. At step 406 of FIG. 4, the secure token is transmitted to the user device 502 from which the content access request 508 is received, in response to the received content access request 508.

In some embodiments, the secure token is transmitted as part of a URL (e.g., as a URL parameter of the URL). In other alternative embodiments, the secure token can be transmitted via a cookie (e.g., a Hypertext Transport Protocol, or HTTP, session cookie) to the user device 502 from which the content access request 508 is received (e.g., in a case that cookies are supported by the user device and are not blocked).

FIG. 7 provides an example of a tokenized URL comprising a secure token. URL 702 includes a reference to the resource (e.g., a content master playlist, variant media playlist, content segment, etc.) and a number of embedded parameters, i.e., ih, x and s. The ih parameter comprises a hash (e.g., MD5 hash) of the client IP address (e.g., the IP address of the user device 502 accompanying the content access request 508), the x parameter comprises an expiration of the secure token, and the s parameter comprises a URL signature (e.g., a hash, such as and without limitation an MD5 hash, of the URL 702 including the ih and s parameters). The URL signature can be used to ensure that the URL has not been tampered with. In addition, the URL signature can be decrypted (e.g., using a decryption key that is shared between the CMS server 504 and the CDN server 506) to retrieve the ih and s parameters.

FIG. 7 also provides an example of an HTTP session cookie comprising the ih, x and s parameters. The ih, x and s parameters in the HTTP session cookie 704 are the same as those in the URL 702 example. In the example, the HTTP session cookie 704 is being transmitted by the media player of a user device (e.g., user device 502), such as and without limitation in connection with requests 512 and 518. An HTTP session cookie comprising the ih, x and s parameters can be sent to the user device 502, e.g., by the CMS server 504 in response 510 and/or the CDN server in responses 514 and 518. HTTP Session cookies (e.g., over Transport Layer Security (TLS)) allow the CDN (e.g., a number of servers of the CDN, such as CDN server 506) and the user device 502 (and a media player of the user device 502) to maintain state during a session (e.g., an Adaptive Video Playback session) and ensure that there is no man-in-the-middle attack that can intercept or steal the content.

At step 408 of FIG. 4, which is performed by the token-based validator (which can be implemented by CDN server 506 of FIG. 5), a content download request (e.g., content download request 512 of FIG. 5) is received (e.g., by CDN server 506 of FIG. 5) from user device 502. In some embodiments, the content download request 512 is in a form of a URL comprising the secure token (e.g., the secure token transmitted to the user device in response 510 to the content access request 508). In accordance with at least one embodiment, the secure token can be transmitted via an HTTP session cookie. The content download request 512 can be a request (e.g., from the user device 502) for content (e.g., a variant media playlist, a number of media segments, etc.).

The request 512 and the secure token are received by the CDN server 506. In some embodiments, the secure token comprises at least the information included in the ih and x parameters. The IP address of the user device 502 from which the content download request 512 is received is transmitted with the content download request 512 to the CDN server 506. Before transmitting the requested content to the user device 502, the secure token is validated.

An example of token-based validation is discussed in more detail below in connection with FIG. 6. Generally and in accordance with some embodiments, token-based validation comprises a check to ensure that the secure token is not expired (is still live), and that either an IP address match exists or that there is an IP address mismatch and the number of IP address mismatches does not exceed (is less than or equal to) a threshold number of IP address mismatches. By allowing a number of mismatches, a user device that is moving and changing IP addresses as a result can still access content, thereby accommodating a mobile user device (and user). In addition, the threshold number of mismatches in a given time period limits the number of simultaneous users to the threshold number, thereby minimizing unauthorized use (or publication) of a content URL (and minimizing unauthorized access to the content) to a limited number of (e.g., the threshold number) of unauthorized users (e.g., simultaneous unauthorized users).

At step 412, a response is transmitted to the user device (e.g., user device 502). The response is in accordance with the outcome of the token-based validation performed in step 410. If access to the requested content is blocked as a result of an unsuccessful token-based validation, the response can be a notification that access is being blocked. If access to the requested content is permitted as a result of a successful token-based validation, the CDN server 506 transmits the requested content and transmits the secure token.

With reference to FIG. 5, responses 514 and 518 are examples of responses transmitted to the user device 502 by the CDN server 506. Response 514 is transmitted in response to content download request 512 and response 518 is transmitted in response to request 516. By way of a non-limiting example, content download request 512 can comprise a request for a variant media playlist and response 514 can transmit the requested variant playlist in a case that the token-based validation is successfully performed in connection with request 512, or a notification that access is blocked in a case that the token-based validation is unsuccessfully performed in connection with request 512.

By way of a further non-limiting example, content download request 516 can comprise a request for a media segment or a variant media playlist and response 518 can transmit the requested media segment or requested variant playlist in a case that the token-based validation is successfully performed in connection with request 516, or a notification that access is blocked in a case that the token-based validation is unsuccessfully performed in connection with request 516.

In the example shown in FIG. 5, request 516 can be repeated and a response 518 to each request 516 can be transmitted to the user device by the CDN server 506. With reference to FIG. 4, steps 408-412 are performed in connection with each request 516 and associated response 518.

Figure 6:
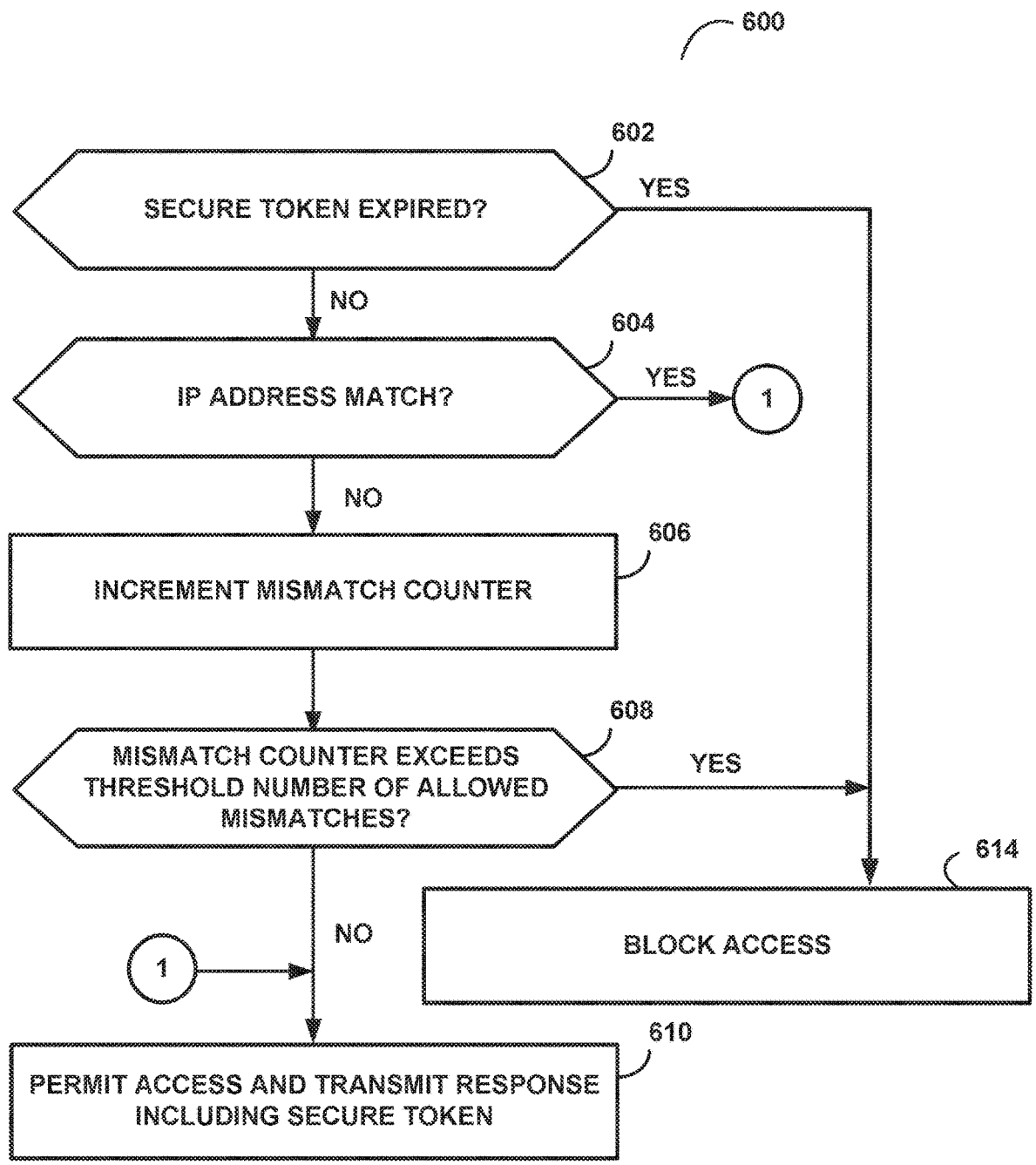
FIG. 6 is a flowchart illustrating steps performed in accordance with some embodiments of the present disclosure.

FIG. 6 provides an example of a token-based validation performed at step 410 of FIG. 4. In some embodiments, the received secure token can comprise the short-lived expiration time which can be retrieved by decrypting the received secure token. In some embodiments, the short-lived expiration time can be transmitted as a parameter (e.g., the x parameter discussed herein). In any case, the retrieved expiration time can be checked against a time of the content download request to ensure that the secure token is not expired (e.g., is still live). With reference to FIG. 7, the expiration information can be retrieved from either parameter x or from parameter s; and the IP address of the secure token can be retrieved from either the ih or the s parameter At step 602 of FIG. 6, the expiration time of the secure token is retrieved and a determination is made whether or not the secure token is expired. If a determination is made that the URL (and secure token) is expired, processing continues at step 614 to block access to the requested content. If a determination is made that the secure token is not expired, processing continues at step 604 to make a determination of whether an IP address match exists. By way of an example, at step 604, the IP address received with the content download request 512 (or content download request 516) is compared with the IP address received with the content access request 508 to make a determination whether the two IP addresses match.

By way of a further non-limiting example, parameter ih or parameter s can be decrypted by the CDN server to retrieve the IP address associated with the secure token (e.g., the IP address associated with the content access request 508), and the retrieved IP address can be compared with the IP address (e.g., of user device 502) associated with the content download request 512 (or content download request 516). As yet another non-limiting example, the received secure token can be used to retrieve the IP address in a stored mapping, e.g., a mapping associating the secure token with the IP address received with the content access request.

If a mismatch is found (e.g., the IP address received with the content access request 508 and retrieved using the secure token) does not match the IP address received with the content download request (e.g., content download request 512 or 518) at step 604, processing continues at step 606 to increment a mismatch counter associated with the secure token. By way of a non-limiting example, incrementing the mismatch counter can comprise initializing the mismatch counter to an initial value (e.g., set to 1 to memorialize the first mismatch), if there is no previous mismatch; or, if there is a previous mismatch, incrementing an existing mismatch counter (e.g., by 1 to memorialize the current mismatch).

At step 608, a determination is made whether or not the number of mismatches (using the mismatch counter) exceeds a threshold number of mismatches. If not, the requested content (e.g., a variant media playlist, a section of content, etc.) is transmitted to the user device (e.g., user device 502) in response to the received content download request (e.g., content download request 512 or 516). If the number of mismatches exceeds the threshold number, the content download request (e.g., content download request 512 or 516) is denied (or blocked), at step 614. In such a case, the user of the user device can make another content access request, for example.

If a determination is made, at step 604, that the retrieved IP address associated with the secure token (e.g., the IP address associated with content access request 508) matches the IP address received with the content download request (e.g., content download request 512 or 516), the secure token is successfully validated, and the requested content is transmitted to the user device (e.g., user device 502), at step 610. In accordance with at least one embodiment, the IP address comparison operation is conditionally performed based on the outcome of a determination that the secure token is not expired (e.g., still live). Thus, in accordance with at least one embodiment, the secure token validation can include both a IP address validation and a temporal validation.

Figure 8:
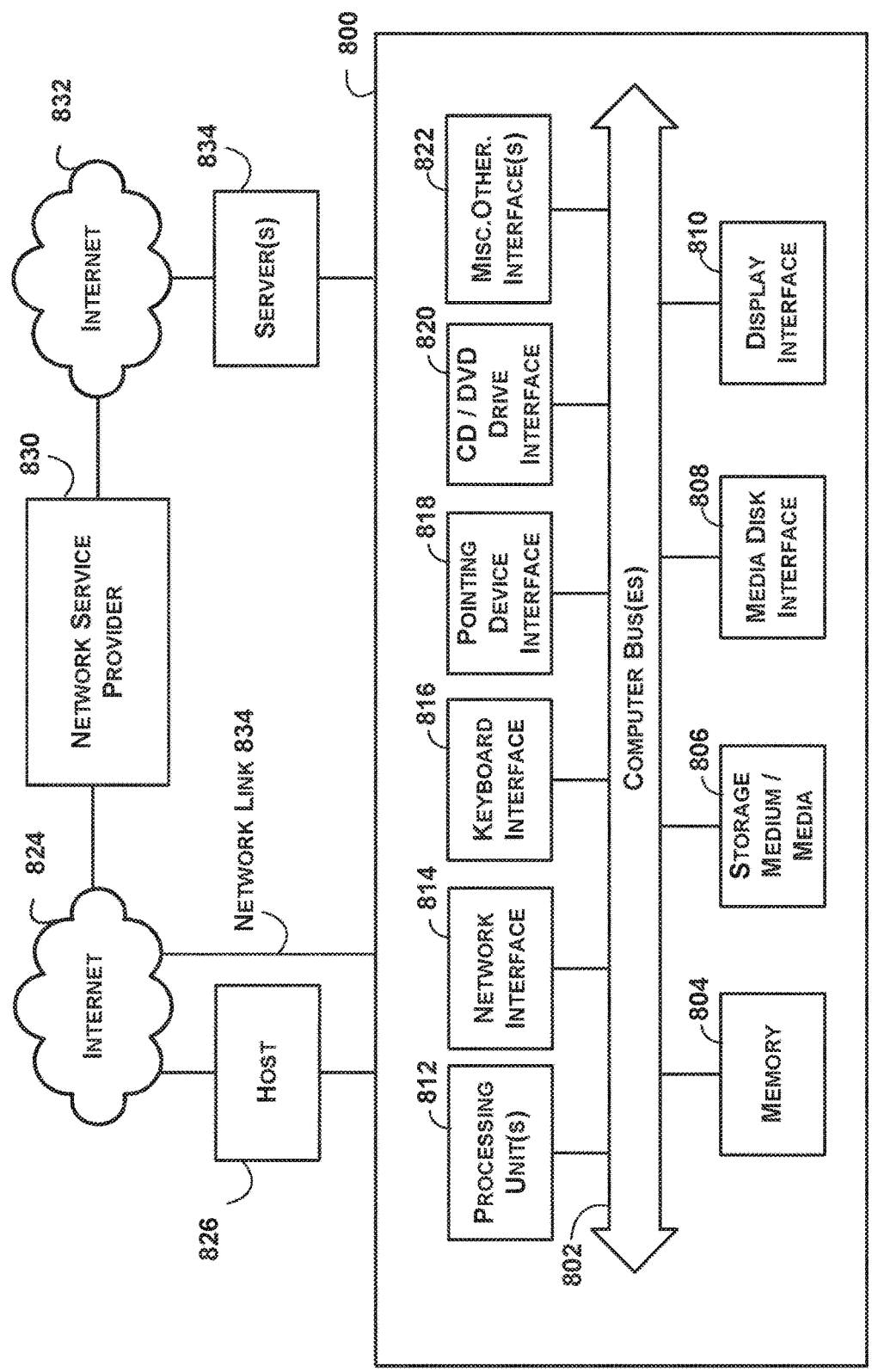
FIG. 8 is a block diagram illustrating the architecture of an exemplary hardware device in accordance with one or more embodiments of the present disclosure.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device and over an electronic communications network, a first request, from a user device, for a content item, a first network address being associated with the first request;
generating, via the computing device, a secure token, the generating comprising encrypting information including the first network address and temporal information to form the secure token;
transmitting, via the computing device and over the electronic communications network to the user device, the secure token in response to the first request for the content item;
receiving, via the computing device and over the electronic communications network, a subsequent request for the content item, from the user device, after the first request for the content item, a subsequent network address being associated with the subsequent request;
obtaining, via the computing device, the secure token associated with the subsequent request;
extracting, via the computing device, the first network address and the temporal information from the secure token associated with the subsequent request;
making, via the computing device, a determination whether or not to permit the subsequent request for the content item, making the determination comprising:
determining, using the temporal information extracted from the secure token associated with the subsequent request, whether or not the secure token has expired;
determining that the subsequent network address does not match the first network address; and
in response to determining that the subsequent network address does not match the first network address, determining, using the subsequent network address associated with the subsequent request for the content item, whether or not a count of network addresses associated with each request for the content item by the user device exceeds a threshold number of network addresses;
permitting, via the computing device, the subsequent request for the content item in a case that the secure token has not expired and the threshold number of network addresses is not exceeded; and
denying, via the computing device, the subsequent request for the content item in a case that the secure token is expired and in a case that the threshold number of network addresses is exceeded.

2. The method of claim 1, the obtaining further comprising retrieving the secure token from the subsequent request.

3. The method of claim 1, the obtaining further comprising retrieving the secure token from a data store at the user device.

4. The method of claim 1, further comprising:
in response to receiving the first request:
storing, via the computing device, the first network address in a network address data store; and
setting, via the computing device, the count of network addresses to one.

5. The method of claim 4, further comprising:
incrementing, via the computing device, the count of network addresses by one in response to determining that the subsequent network address does not match the first network address.

6. The method of claim 1, the temporal information comprising information indicating an expiration for the secure token.

7. The method of claim 1, the secure token is transmitted in response to the first request in a URL including a reference to the content item requested in the first request.

8. The method of claim 7, the URL further comprising the temporal information, a hash of the first network address and a URL signature.

9. The method of claim 7, the URL signature being generated using the temporal information and the hash of the first network address.

10. The method of claim 1, the secure token is transmitted in response to the first request in a cookie for storage at the user device.

11. The method of claim 10, the cookie comprising the temporal information and a hash of the first network and the address secure token.

12. A non-transitory computer-readable storage medium tangibly encoded with computer-executable instructions that when executed by a processor associated with a computing device perform a method comprising:
receiving, over an electronic communications network, a first request, from a user device, for a content item, a first network address being associated with the first request;
generating a secure token, the generating comprising encrypting information including the first network address and temporal information to form the secure token;

transmitting, over the electronic communications network to the user device, the secure token in response to the first request for the content item;

receiving, over the electronic communications network, a subsequent request for the content item, from the user device, after the first request for the content item, a subsequent network address being associated with the subsequent request;

obtaining the secure token associated with the subsequent request;

extracting the first network address and the temporal information from the secure token associated with the subsequent request;

making a determination whether or not to permit the subsequent request for the content item, making the determination comprising:

determining, using the temporal information extracted from the secure token associated with the subsequent request, whether or not the secure token has expired;

determining that the subsequent network address does not match the first network address; and in response to determining that the subsequent network address does not match the first network address, determining, using the subsequent network address associated with the subsequent request for the content item, whether or not a count of network addresses associated with each request for the content item by the user device exceeds a threshold number of network addresses;

permitting the subsequent request for the content item in a case that the secure token has not expired and the threshold number of network addresses is not exceeded; and denying the subsequent request for the content item in a case that the secure token is expired and in a case that the threshold number of network addresses is exceeded.

13. The non-transitory computer-readable storage medium of claim 12, the obtaining further comprising retrieving the secure token from the subsequent request.

14. The non-transitory computer-readable storage medium of claim 12, the obtaining further comprising retrieving the secure token from a data store at the user device.

15. The non-transitory computer-readable storage medium of claim 12, further comprising:

in response to receiving the first request:
storing, via the computing device, the first network address in a network address data store; and
setting, via the computing device, the count of network addresses to one.

16. The non-transitory computer-readable storage medium of claim 15, further comprising:
incrementing, via the computing device, the count of network addresses by one in response to determining that the subsequent network address does not match the first network address.

17. The non-transitory computer-readable storage medium of claim 12, the temporal information comprising information indicating an expiration for the secure token.

18. The non-transitory computer-readable storage medium of claim 12, the secure token is transmitted in response to the first request in a URL including a reference to the content item requested in the first request.

19. The non-transitory computer-readable storage medium of claim 18, the URL further comprising the temporal information, a hash of the first network address and a URL signature.

20. A computing device comprising:

a processor;

a non-transitory storage medium for tangibly storing thereon program logic for execution by the processor, the program logic comprising:

receiving logic executed by the processor for receiving, over an electronic communications network, a first request, from a user device, for a content item, a first network address being associated with the first request;

generating logic executed by the processor for generating a secure token, the generating comprising encrypting information including the first network address and temporal information to form the secure token;

transmitting logic executed by the processor for transmitting, over the electronic communications network to the user device, the secure token in response to the first request for the content item;

receiving logic executed by the processor for receiving, over the electronic communications network, a subsequent request for the content item, from the user device, after the first request for the content item, a subsequent network address being associated with the subsequent request;

obtaining logic executed by the processor for obtaining the secure token associated with the subsequent request;

extracting logic executed by the processor for extracting the first network address and the temporal information from the secure token associated with the subsequent request;

making logic executed by the processor for making a determination whether or not to permit the subsequent request for the content item, the logic for making the determination comprising:

determining logic executed by the processor for determining, using the temporal information extracted from the secure token associated with the subsequent request, whether or not the secure token has expired;

determining logic executed by the processor for determining that the subsequent network address does not match the first network address; and determining logic executed by the processor for determining, in response to determining that the subsequent network address does not match the first network address and using the subsequent network address associated with the subsequent request for the content item, whether or not a count of network addresses associated with each request for the content item by the user device exceeds a threshold number of network addresses;

permitting logic executed by the processor for permitting the subsequent request for the content item in a case that the secure token has not expired and the threshold number of network addresses is not exceeded; and denying logic executed by the processor for denying the subsequent request for the content item in a case that the secure token is expired and in a case that the threshold number of network addresses is exceeded.

* * * * *